United States Patent
Sendonaris et al.

(10) Patent No.: US 7,420,947 B2
(45) Date of Patent: Sep. 2, 2008

(54) COMMUNICATION SYSTEM PERFORMANCE USING POSITION LOCATION INFORMATION

(75) Inventors: Andrew Sendonaris, San Jose, CA (US); Da-Shan Shiu, Cupertino, CA (US); David Patterson, Carlsbad, CA (US); Pavathanathan Subrahmanya, Sunnyvale, CA (US); Daisuke Terasawa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 871 days.

(21) Appl. No.: 10/650,270

(22) Filed: Aug. 28, 2003

(65) Prior Publication Data

US 2004/0131032 A1 Jul. 8, 2004

Related U.S. Application Data

(60) Provisional application No. 60/407,410, filed on Aug. 30, 2002.

(51) Int. Cl.
*H04B 7/216* (2006.01)
(52) U.S. Cl. ............... 370/335; 370/342; 370/441; 370/479; 375/147; 455/440
(58) Field of Classification Search ............... None
See application file for complete search history.

(56) References Cited

U.S. PATENT DOCUMENTS

| | | | | |
|---|---|---|---|---|
| 5,805,648 A | * | 9/1998 | Sutton | ............... 375/367 |
| 6,161,022 A | * | 12/2000 | Hwang et al. | ............... 455/561 |
| 6,188,354 B1 | * | 2/2001 | Soliman et al. | ............... 342/387 |
| 6,191,738 B1 | * | 2/2001 | Pfeil et al. | ............... 342/457 |
| 6,445,728 B1 | * | 9/2002 | Byun | ............... 375/142 |
| 6,542,743 B1 | * | 4/2003 | Soliman | ............... 455/436 |
| 6,775,252 B1 | * | 8/2004 | Bayley | ............... 370/328 |
| 2002/0039381 A1 | | 4/2002 | Dooley et al. | |

FOREIGN PATENT DOCUMENTS

| | | |
|---|---|---|
| EP | 1096698 | 2/2001 |
| WO | 0106274 | 1/2001 |
| WO | 0117125 | 3/2001 |
| WO | 01017155 | 3/2001 |
| WO | 0176088 A2 | 10/2001 |

* cited by examiner

*Primary Examiner*—Wing F. Chan
*Assistant Examiner*—Brian Roberts
(74) *Attorney, Agent, or Firm*—Donald C. Kordich; Linda G. Gunderson; Thomas R. Rouse

(57) ABSTRACT

A method and apparatus for using information about a mobile terminal's location relative to a base station can improve performance of a communication system. In addition, information about the mobile terminal's velocity relative to the base station may be used to improve performance of the communication system. The location information may be used to estimate a nominal PN offset, and a set of PN offset to use, for processing communication signals. The velocity information may be used to estimate a nominal frequency of the communication signals.

19 Claims, 6 Drawing Sheets

COMMUNICATION SYSTEM PERFORMANCE USING POSITION LOCATION INFORMATION

RELATED APPLICATIONS

This application claims priority to U.S. Provisional Application No. 60/407,410, filed Aug. 30, 2002.

BACKGROUND

1. Field

The invention relates generally to wireless communication, and more particularly to processing signals based on the position of a remote terminal relative to a base station.

2. Description of the Related Art

A wireless communication system may comprise multiple remote terminals and multiple base stations. Communication between the remote terminals and the base stations travel over a wireless channel and can be accomplished using one of a variety of multiple access techniques which facilitate a large number of users in a limited frequency spectrum. Examples of multiple access techniques include time division multiple access (TDMA), frequency division multiple access (FDMA), and code division multiple access (CDMA).

Systems based on CDMA may provide certain advantages over other types of multiple access systems. For example, CDMA permits the frequency spectrum to be reused multiple times, thereby permitting an increase in system user capacity. Additionally, use of CDMA techniques permits the special problems of the wireless channel to be overcome by mitigation of the adverse effects of multipath, e.g. fading, while also exploiting the advantages thereof. A CDMA system is typically designed to implement one or more standards, such as IS-95, CDMA2000, and WCDMA standards, all of which are known in the art and incorporated in their entirety herein.

In a system based on CDMA, communication signals are "spread" using a pseudorandom (PN) code. Because the signals share a common frequency spectrum, individual signals are distinguished by their unique PN code. In a CDMA system the communication signals are also synchronized to each other.

In a typical CDMA system the signals transmitted from base stations to remote terminals, commonly referred to as the forward link, include a pilot signal that has a common PN sequence. Each base station transmits its pilot signal with an offset in time from the pilot signals of neighboring base stations, so that the pilot signals can be distinguished from one another at the remote terminal. At any given time, the remote terminal may receive a variety of pilot signals from multiple base stations. Using a copy of the PN sequence produced by a local PN generator, the terminal can determine the relative phase, or PN offset, of the received pilot signals, and thereby identify the corresponding base station that transmitted the pilot signal. The relative phase of the pilot signals is measured by matching, or correlating, the local PN sequence to the received signals. Correlating to the pilot channel provides a coherent phase reference for demodulating other communication signals sent on the forward link. Although there is no pilot signal sent by the remote terminal to the base station, on what is commonly referred to as the reverse link, the remote terminal is assigned a unique PN sequence used to transmit signals to the base station signal. The base station correlates to the PN sequence assigned to the remote unit in the reverse link signal, and can thereby identify which of the remote terminals the signal was transmitted by.

Typically, a search engine, used in the correlation process, steps through a set of PN offsets, commonly called a search window, that is likely to contain the PN offset of the communication signal. For example, the nominal PN offset of the pilot signals received at a remote terminal are not only the result of the offsets introduced into the pilot signal by the individual base station but they are also due to the relative location of the remote terminal to the various base stations. Because the pilot signals travel different distances from various base stations to a remote terminal, the pilot signals received by the remote terminal will be delayed, and therefore offset, by different amounts of time due to the differing distance each of the individual pilot signals traveled. The uncertainty in the PN offset of the received pilot signal causes the remote terminal to search through large search windows, consuming scarce resources in the terminal that could be utilized for other functions.

Determining the nominal PN offset is even more complicated if the remote terminal is mobile and moving in relation to the base stations. In a typical mobile terminal, to conserve power and extend battery life, the terminal may enter a "sleep mode" where most communication functions, including the search engine, have power removed. If the mobile terminal moves relative to the base station before power is reapplied, the nominal PN offset of the pilot signal received from a base station will have changed. Thus, even if the nominal PN offset of a pilot signal is known when the remote unit went to "sleep," when the mobile terminal wakes up the nominal PN offset can be different and a new search will have to be performed that will consume additional remote terminal resources.

An additional problem introduced by movement of a mobile terminal is that while the terminal is in motion relative to a base station, there is an apparent change in the frequency of signals received at both the terminal and the base station. This apparent change in frequency is due to the well known phenomenon referred to as Doppler shift. Frequency changes due to the Doppler shift require both the mobile terminal and the base station to perform searches using different frequency hypotheses, and then determine which hypothesis produces the best result. Again, searching using various hypotheses consumes resources.

There is therefore a need in the art for techniques to provide an improved estimate of the nominal PN offset of pilot signals. In addition, there is a need in the art for techniques to improve the selection of frequency hypotheses.

SUMMARY

A method and apparatus for using location information about a mobile terminal relative to a base station to improve performance of the communication system is described. In addition, information about the mobile terminal's velocity relative to the base station may be used to improve performance of the communication system. The location information may be used to estimate a nominal PN offset, and a set of PN offsets to use, for processing communication signals. The velocity information may be used to estimate a nominal frequency of the communication signals.

In one aspect, a search window for processing signals in a wireless communications system is determined based on the location of the mobile terminal. The system can determine the location of at least one mobile terminal in relation to a base station, having a known location. A distance between the mobile terminal and the base station is calculated based on their respective locations. A nominal PN offset of signals transmitted between the base station and the mobile terminal is estimated based on the distance between the mobile terminal and the base station. Using the estimated PN offset, the system determines a search window, used for processing received signals.

In accordance with another aspect, the mobile terminal estimates the nominal PN offset that a signal from a base station will have upon reception by the mobile terminal, based on the distance between the mobile terminal and the base station. Using the nominal PN offset, the mobile terminal determines a set of PN offsets to search for the signal transmitted by the base station. In addition, the base station estimates the nominal PN offset that a signal from the mobile terminal will have upon reception by the base station, based on the distance between the mobile terminal and the base station. Using the nominal PN offset, the base station determines a set of PN offsets to search for the signal transmitted by the mobile terminal.

In another aspect, the mobile terminal, the base station, or both, can estimate the nominal frequency of received signals based on the velocity of the mobile terminal relative to the base station. The frequency of the received signal varies because of the Doppler effect caused by the relative motion between the mobile terminal and the base station.

In still another aspect, determining the location of the mobile terminal is performed in the mobile terminal. For example, the mobile terminal can receive navigation signals from a navigation system, such as GPS, LORAN-C, or other standard navigation system. The mobile terminal uses the navigation signals to determine its location relative to the base station. The mobile terminal may also transmit its location to the base station for use by the base station.

In another aspect, the mobile terminal makes measurements on the received navigation signals and sends the measurements to the base station. The base station uses the measurements sent by the mobile terminal to determine the location of the mobile terminal. The base station may also transmit the location information to the mobile terminal for use by the mobile terminal.

Other features and advantages of the present invention should be apparent from the following description of the preferred embodiment, which illustrates, by way of example, principles of the invention.

DETAILED DESCRIPTION

Knowledge of the position and velocity of a remote terminal in a wireless communication system is utilized to improve the performance of acquiring and tracking signals. For example, in a communication system based on CDMA, such as a system based on TIA IS-95, WCDMA, or CDMA2000, knowledge of the location of a mobile terminal relative to nearby base stations can be used to better estimate the nominal PN offset of signals received at the mobile terminal and the base station. PN offset is typically measured in chips, where a chip represents one bit of the PN code of the signal. Knowledge of the velocity of a mobile terminal relative to the base station can be used to better estimate the nominal frequency of the communication signal due to Doppler shift.

Figure 1:
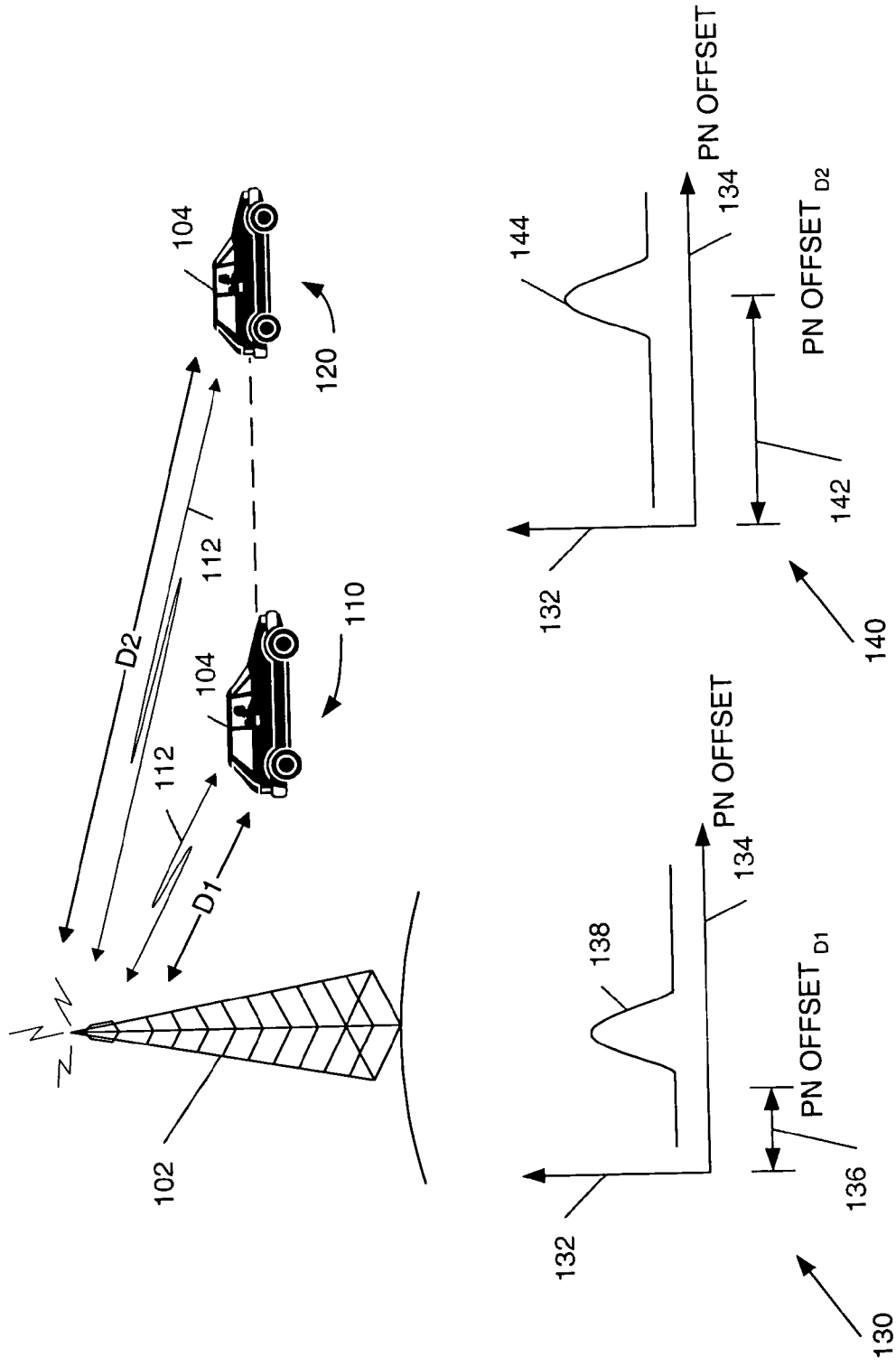
FIG. 1 is a block diagram illustrating phase delay of a transmitted signal in a wireless communication system.

FIG. 1 is a block diagram illustrating PN offset of a pilot signal transmitted in a wireless communication system based on CDMA. As illustrated in FIG. 1, a base station 102 is in communication with a mobile terminal 104 that is shown at two different locations. When the mobile unit 104 is at a first location 110, the communication signal 112 between the base station 102 and the mobile terminal 104 travels a first distance represented as D1. When the mobile terminal moves to a second location 120, the communication signal 112 between the mobile terminal 104 and the base station 102 travels a second distance represented as D2. The second distance, D2, is greater that the first distance, D1, but this is not necessarily the situation. In FIG. 1, the communication signal 112 travels a longer distance, and a correspondingly longer time, when traveling between the mobile terminal 104 and the base station 102 when the mobile unit is at the second location 120 than when the mobile terminal is at the first location 110.

Differences in the travel time of signals between the mobile terminal and the base station introduce different PN offsets in the received signals relative to the locally generated PN sequence in the mobile terminal. In FIG. 1, graph 130 illustrates the PN offset of a pilot signal transmitted from the base station 102 to the mobile terminal 140 at the first location 110. The vertical axis 132 represents the received signal strength, and the horizontal axis 134 represents the PN offset, in chips, between the locally generated PN sequence in the mobile terminal and the PN sequence of the received signal 112. In a CDMA communication system, when the communication signal 112 is received at the mobile terminal 104 a process commonly referred to as correlation is performed to assist in demodulating the received signal 112. In correlation the locally generated PN sequence, or code, is shifted in phase, or time, until it matches the PN sequence, or code, of the received signal 112.

When the locally generated PN code correlates to the PN code of the received signal 112, there is a peak, or maximum, power detected in the received signal strength. For example, when the mobile terminal is at the first location 110, the phase of the locally generated PN code was offset an amount PN-offset$_{D1}$, represented by 136, resulting in a peak in the power of the received signal strength represented by 138. If the mobile terminal 104 moves to the second location 120, the PN offset of the communication signal 112 received at the mobile terminal is different. In FIG. 1, graph 140 illustrates the PN offset of a pilot signal transmitted from the base station 102 to the mobile terminal 104 at the second location 120. As illustrated in graph 130, the correlation between the locally generated PN code and the PN code of the received signal 112 occurred at PN-offset$_{D2}$, represented by 142, resulting in a peak in the power of the received signal strength represented by 144.

Because the signal 112 travels a longer distance when the mobile terminal is at the second location 120 than when it is at the first location 110, the PN-offset$_{D2}$ is greater than the PN-offset$_{D1}$. The mobile terminal correlates hypothesized or test values with the received signal to be able to demodulate the communication information, and the correlation process consumes resources of the mobile terminal. When doing an initial correlation, if the remote terminal's location is not known, for example it could be at either location 110 or 120, then the search engine needs to search a window of PN offsets that is long enough to cover both PN-offset$_{D1}$ and PN-offset$_{D2}$. However, if it is known that the remote terminal is at a particular location 110, a smaller search window can be used. Using a smaller search window results in reducing the amount of time, and corresponding resources, required for the mobile terminal to correlate to the received signal.

In a typical CDMA system, because the location of the remote terminal relative to the base station is not known, the search window size (W), in chips, may be related to the radius R of the communication cell by the following:

$$W = ((2*R)/c)*2*\text{chipRate chips} \quad \text{Eq. (1)}$$

In equation (1), c is the speed of light (approximately $3 \times 10^8$ m/s).

Larger cell sizes of the communication system correspond to potentially larger search windows. For example, if a cell has a radius R of 320 km, and the system uses a chip rate of $3.84 \times 10^6$ chips per second, then the search window W could be as large as:

$$W = ((2*320*10^3)/3*10^8)*2*(3.84*10^6) \text{chips} \quad \text{Eq. (2)}$$

$$W = 8192 \text{ chips}$$

If a search was performed in one-half chip increments, or offsets, then there would be potentially 16384 offsets in a search window. If the cell radius is 10 km a correspondingly smaller search window size of 512 one-half chip offsets can be used. The larger the search window size, the more resources of the remote terminal that are consumed during a search. In addition, search window size affects the probability of a correlation error, or false alarm, with a larger search window size resulting in a higher per-window false alarm rate for a given per-offset false alarm probability.

If the remote terminal's location within the cell, or the distance from the base station to the remote terminal, is known, then a correspondingly smaller search window may be used. This conserves resources of the remote terminal and reduces the potential number of false alarms. The present invention utilizes location information to more efficiently adjust the search window size. For example, even if the cell radius is 320 km, if it is known that the remote unit is within 10 km of the base station, then instead of searching a window of PN offsets of 16384, a window of only 512 PN offsets need be searched. Use of a smaller search window not only reduces the resources that the remote terminal needs to dedicate to the search process but also decreases the probability of a false alarm.

Although the example describes the correlation process at the remote, or mobile, terminal, the same variation in PN-offset due to the distance between the base station and the mobile terminal is present in the signals received at the base station. In a CDMA system, the mobile terminals typically do not transmit a pilot signal so the base station does not receive a pilot signal to which it can correlate. But, the base station still needs to correlate to the signal received from the mobile unit, and because the mobile terminal transmits its signal synchronized to the base station time, knowledge of the distance between the mobile terminal and the base station can be used to estimate the PN-offset in the signal received at the base station.

As discussed further below, if the distance between the mobile unit and the base station is known, then the system can determine an estimate of the PN-offset that corresponds to correlation between the received signal and the local signal. Using the estimated PN-offset can reduce the amount of time and resources needed to perform the correlation process and decrease the potential number of false alarms.

Figure 2:
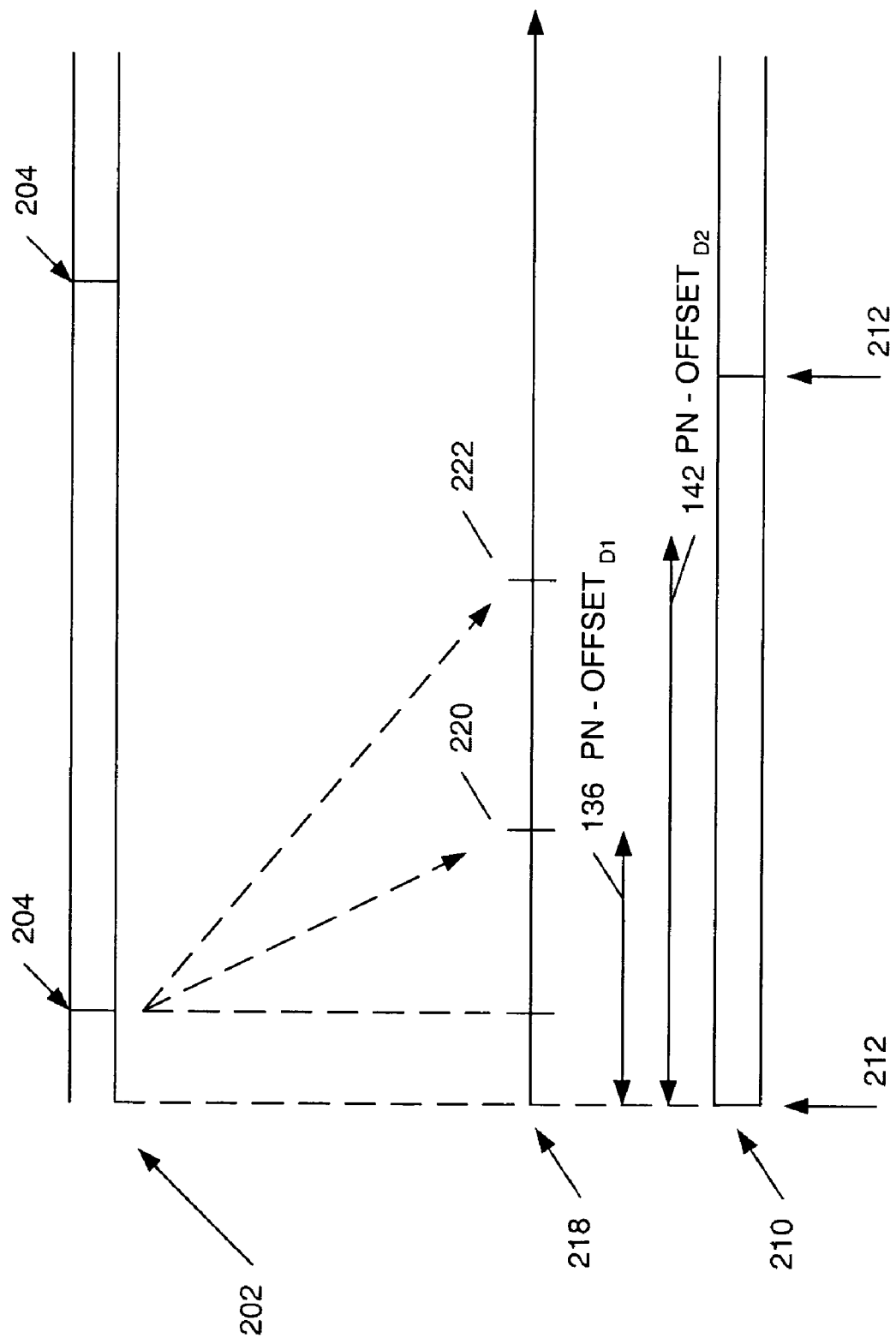
FIG. 2 is a block diagram illustrating additional detail of the phase delay of a signal transmitted in a wireless communication system.

FIG. 2 is a block diagram illustrating additional detail of the PN offset of a signal transmitted in a wireless communication system. In FIG. 2 the pilot signal 202 transmitted by the base station 102 is illustrated. In general, the pilot signal is a repeating pseudorandom (PN) code. The code is pseudorandom, i.e. not really random, because it is a known sequence of "1" and "0" data that repeats. The beginning bits, or chips, of the PN code, or the epoch, is designated at points 204. At the mobile terminal a replica 210 of the known PN code is locally generated. The locally generated PN code has epochs illustrated at points 212.

As described in relation to FIG. 1, as the pilot signal travels from the base station to the mobile terminal, time passes so that the signal appears delayed in time when received by the mobile terminal. That is, referring back to FIG. 2, because of the distance traveled, the epoch 204 of the pilot signal is not received in the signal 218 at the mobile terminal until later in time 220. During correlation the mobile terminal will adjust its locally generated PN code 210 so that it matches, or is aligned, with the epoch 220 of the received PN code 218. In the example illustrated in FIG. 2, the locally generated PN code 210 is delayed to match the PN code in the received signal 218. The amount of delay needed so that the epochs of the two PN codes 218, 210 align when the mobile terminal 104 is at the first location 110 is the PN-offset$_{D1}$, labeled 136. If the mobile terminal moves to the second location 120 that is further from the base station, the PN code received 218 is delayed further to epoch 222. The amount of delay needed so that the two PN codes 218, 210 align at the second location of the mobile unit is PN-offset$_{D2}$, labeled 142. As the mobile terminal changes location the amount of PN-offset needed to align the two PN codes varies.

In addition to the PN-offset changing as the mobile terminal changes location, the frequency of received signals changes due to the Doppler effect. The Doppler effect changes the frequency of the signal received from a transmitter when the transmitter and receiver are moving relative to each other. If the transmitter and receiver are moving closer to each other the transmitted frequency is compressed, increasing the frequency of the signal received. If the transmitter and receiver are moving away from each other, the transmitted frequency is expanded, decreasing the frequency of the signal received.

Because of relative motion between the base station and the mobile terminal, the communication signals transmitted between the base station and the mobile terminal are received at different frequencies than the frequency transmitted. Due to the frequency uncertainty, a receiver typically will be configured to receive multiple, different frequencies to allow for possible Doppler shifts. Because a receiver cannot be configured to receive all possible frequencies, hypotheses of what the received frequency will be are used to provide an adequate frequency range to receive the transmitted signal. Knowledge of the relative frequency of the mobile terminal to the base station can improve selection of the hypotheses to be used.

Figure 3:
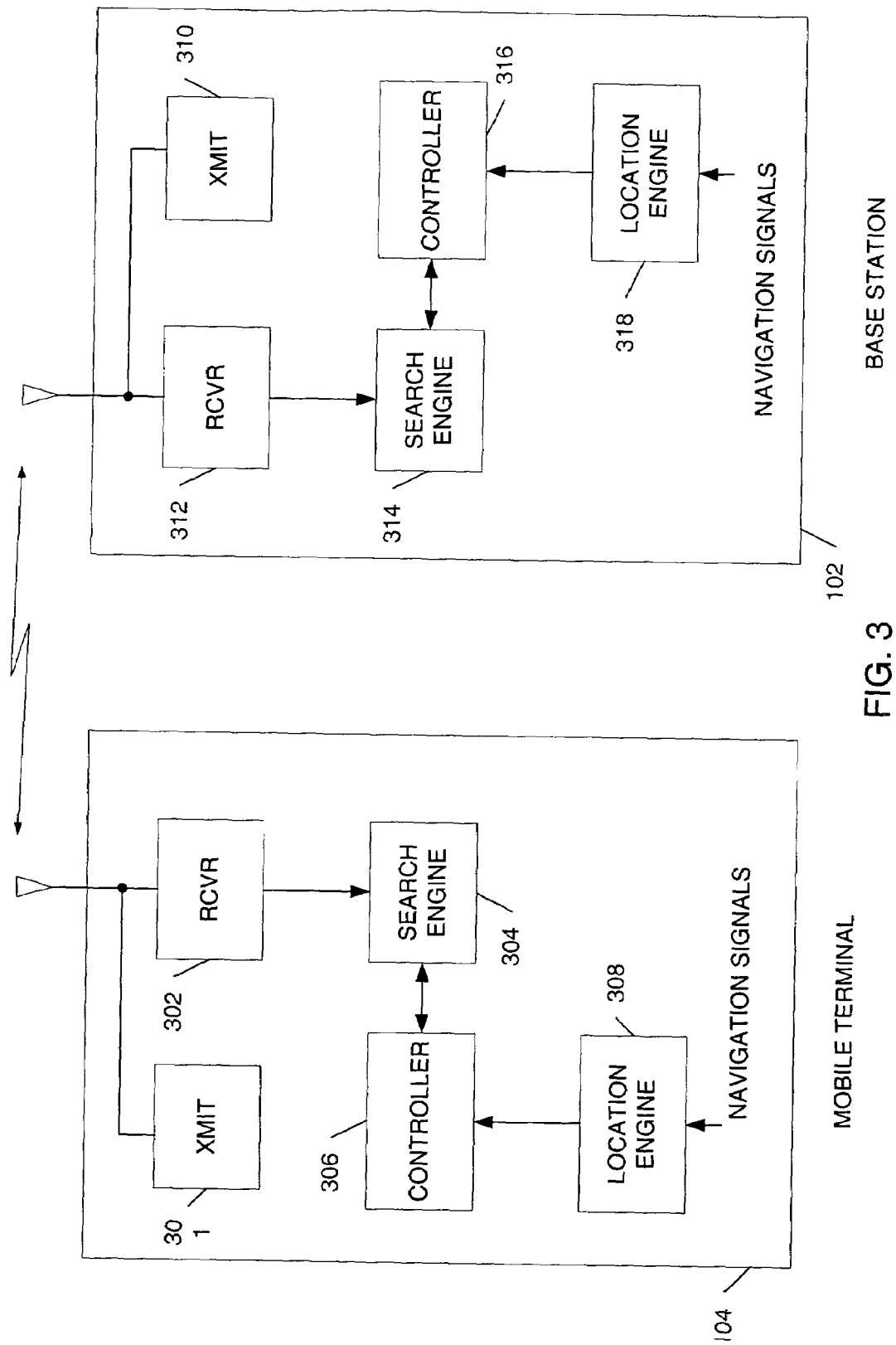
FIG. 3 is a block diagram illustrating an embodiment of a mobile terminal and a base station.

FIG. 3 is a block diagram illustrating an embodiment of a mobile terminal and a base station constructed in accordance with the invention. Mobile terminal 104 includes a transmitter 301 and a receiver 302 for communicating signals to and from the base station 102. The output of the receiver 302 is connected to a search engine 304. As described below, the search engine 304 performs searches on the received pilot signals to correlate to them. The mobile terminal also includes a controller 306 and a location engine 308.

The base station 102 includes a transmitter 310 and a receiver 312 for communicating to and from the mobile terminal 104. The output of the receiver 312 is connected to a search engine 314 that performs searches on the received signals. The base station also includes a controller 316 and a location engine 318.

In one embodiment, the mobile terminal receives a communication signal from the base station 102. Location engine 308 receives navigation information and determines the location, velocity, and direction of the remote terminal 104 and outputs them to the controller 306. The controller 306 determines hypotheses about the received signal frequency and PN-offset based upon the output of the location engine. The search engine 304, using the hypothesis determined by the controller 306, searches for the pilot signal in the communication signal received from the base station. In one embodiment, the location engine 308 receives navigation information in the form of signals from a navigation system, such as, the Global Positioning System (GPS) or LORAN-C, or other standard navigational system. In another embodiment, the location engine 308 receives navigation information from the cellular infrastructure. In yet another embodiment, the location engine receives navigation information from both a standard navigation system and the cellular infrastructure. In another embodiment, the remote unit 104 receives navigation information signals and passes them onto the base station where the remote unit location, velocity, and direction are determined and transmitted back to the remote unit.

In another embodiment, the base station 102 receives a communication signal from the remote unit 104. The location engine 318 receives navigation information and determines the location, velocity and direction of the remote unit and outputs them to the controller 316. The controller 314 determines hypotheses about the received signal frequency and PN-offset based upon the output of the location engine. The search engine 314, using the hypothesis determined by the controller 316, correlates to the signal received from the mobile terminal 104. In one embodiment, the location engine 318 receives navigation information in the form of signals from the remote terminal 104 and a navigation system, such as, the Global Positioning System (GPS) or LORAN-C, or other standard navigational system. In another embodiment, the location engine 318 receives navigation information from the remote terminal 104 and the cellular infrastructure. In yet another embodiment, the location engine receives navigation signals from the remote terminal 104 and both a standard navigation system and the cellular infrastructure. In another embodiment, the remote unit 104 location, velocity, and direction are determined in the remote unit and transmitted to the base station 102.

Figure 4:
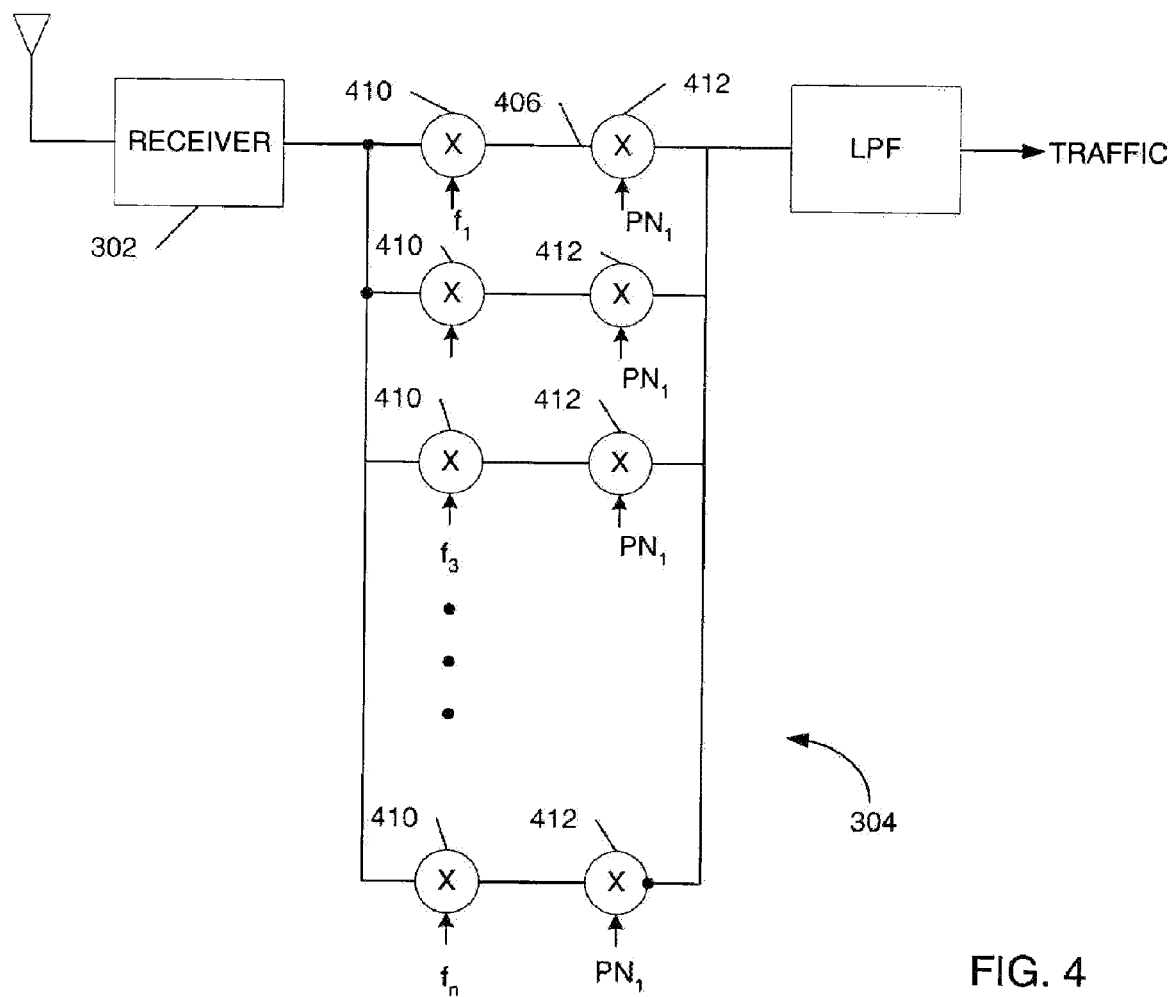
FIG. 4 is a block diagram illustrating exemplary hardware that can be used to implement various aspects of the invention.

FIG. 4 is block diagram illustrating exemplary hardware that can be used to implement various aspects of the invention. In particular, FIG. 4 illustrates hardware that can be used to account for frequency uncertainty due to the Doppler shift, and delay uncertainty due to variations in the PN-offset of the received signal. In FIG. 4, receiver 302 accepts the communication signal. The output of receiver 302 is connected to multiple paths to be correlated. A single path 406 will be described in detail.

The output of receiver 302 is connected to mixer 410 to downconvert the received signal with a reference signal at the appropriate frequency. As discussed, it is not known what frequency the reference signal needs to be because the frequency of the received signal varies due to Doppler caused by the relative velocity between the mobile terminal and the base station. Thus, multiple mixers 410 with different reference frequencies ($f_1, f_2, \ldots, f_n$), based upon the selected hypothesis, are needed. The output of the mixers are connected to a second mixer 412 where the locally generated PN code is mixed with the received signal. The locally generated PN code used in the mixers 412 have different PN-offsets based upon the selected hypothesis to cover the expected PNoffsets ($PN_1, PN_2, \ldots, PN_n$) corresponding to the distance between the remote terminal and the base station.

Thus, a set of potential frequencies for the received signal, and a set of potential PN-offsets, are hypothesized. The number of different combinations of hypothesis can be very large and would consume a large mount of resources in the mobile terminal to attempt many of the different combinations of hypothesis.

Knowledge of the relative speed of the mobile terminal to the base station allows better, and fewer, selections of hypothesis for the frequency. In addition. knowledge of the distance between the mobile terminal and the base station allows better, and fewer, selections, of hypothesis for the PN-offset.

Figure 5:
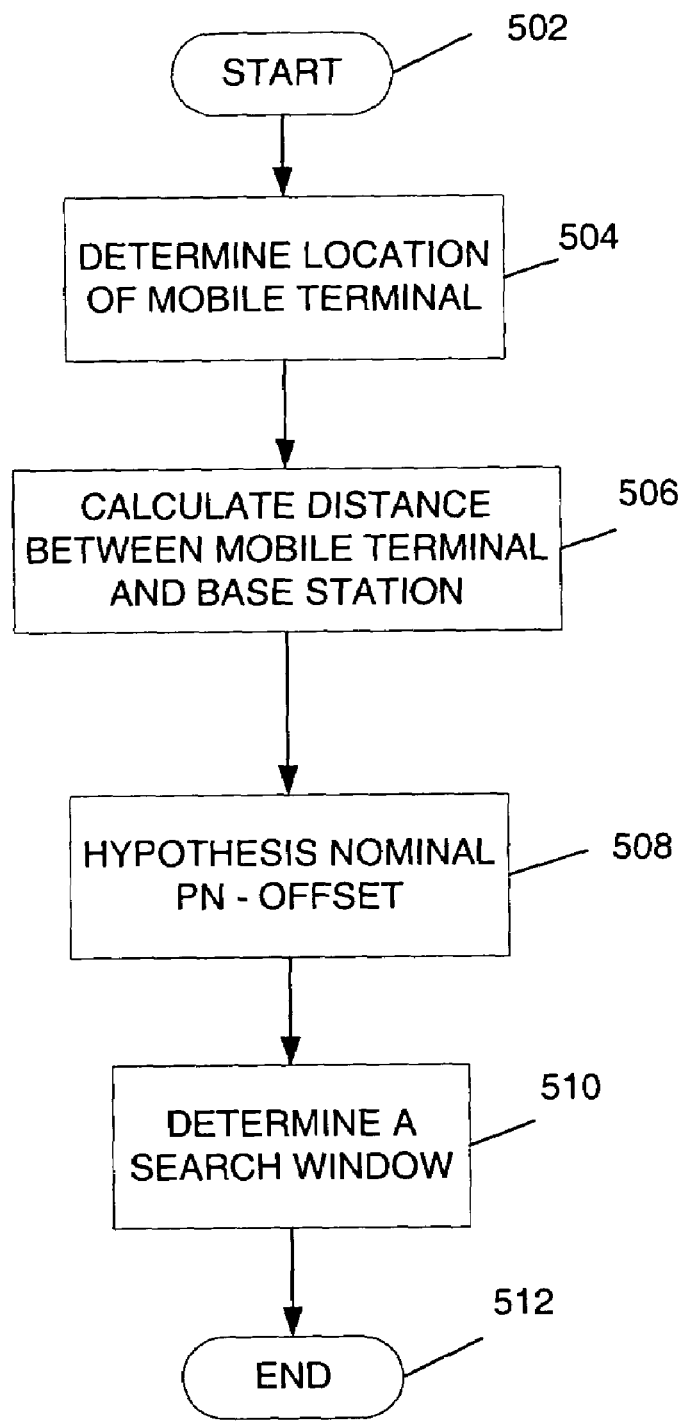
FIG. 5 is a flow diagram illustrating a technique to determine a search window.

FIG. 5 is a flow diagram illustrating a technique to determine a search window. Flow begins in block 502. Flow then continues in block 504 where the location of the mobile terminal is determined. Then in block 506 the distance between the mobile terminal and the base station is calculated. In block 508 a hypothesis of the nominal PN-offset of the received signal is made. Flow then continues to block 510 where a set of PN-offsets, i.e. a search window, used to search for the received communication signal is determined. Flow then stops in block 512.

Figure 6:
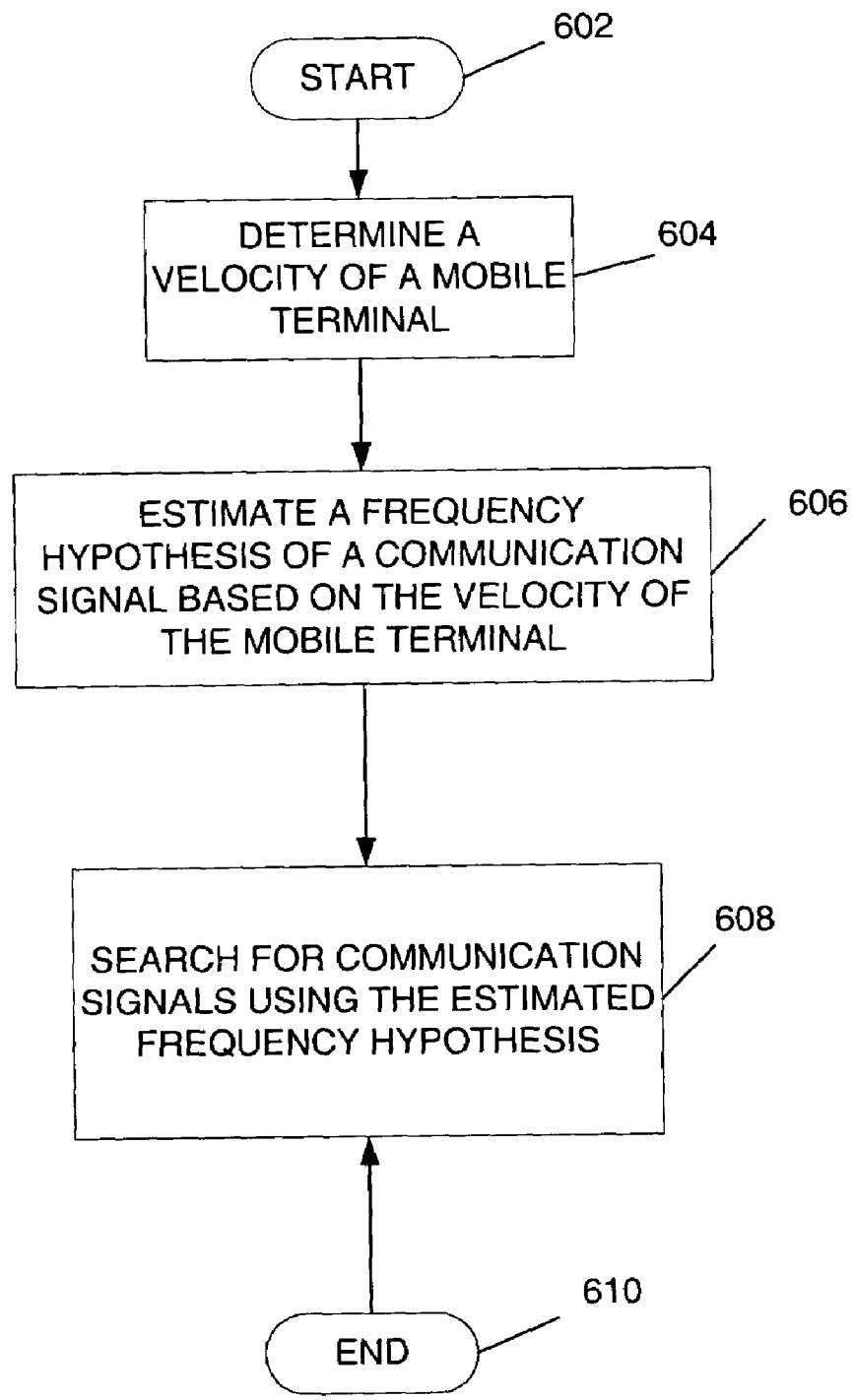
FIG. 6 is a flow diagram illustrating a technique to determine a frequency hypothesis.

FIG. 6 is a flow diagram illustrating a technique to determine a frequency hypothesis. Flow begins in block 602. In block 604 the velocity of the mobile terminal relative to the base station is determined. Flow continues to block 606 where a frequency hypothesis for the received communication signal is estimated based on the velocity of the mobile terminal. Flow then continues to block 608 where a search for the communication signal is performed using the estimated frequency hypothesis. Flow then stops in block 610.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

We claim:

1. A method of determining a search window for processing signals in a wireless communications system, the method comprising:
   determining a distance between at least one mobile terminal and a base station based on their respective locations;
   estimating a nominal PN offset of signals transmitted between the base station and the at least one mobile terminal based on the distance between the at least one mobile terminal and the base station; and
   determining a search window used for processing received signals based on the estimate of the nominal PN offset.

2. A method as defined in claim 1, wherein estimating the nominal PN offset and determining the search window are performed in the base station.

3. A method as defined in claim 2, wherein the estimated nominal PN offset is transmitted from the base station to the at least one mobile terminal.

4. A method as defined in claim 2, wherein the search window is transmitted from the base station to the at least one mobile terminal.

5. A method as defined in claim 1, wherein estimating the nominal PN offset and determining the search window are performed in the at least one mobile terminal.

6. A method as defined in claim 5, wherein the received signals comprise signals received at the at least one mobile terminal and include a pilot signal.

7. A method as defined in claim 6, wherein the pilot signal is encoded with a pseudorandom code.

8. The method as defined in claim 7, wherein different base station pilot signals are distinguished by their unique PN offsets.

9. A mobile terminal comprising:
  a receiver configured to receive a communication signal from a base station;
  a controller configured to estimate a nominal PN offset of the received communication signals based on a distance between the mobile terminal and the base station, and to determine a search window to be used for processing received signals based on the estimate of the nominal PN offset; and
  a search engine configured to accept the search window and to perform a search of the received communication signal using the search window.

10. A mobile terminal as defined in claim 9, wherein the received communication signal comprises a pilot signal.

11. A mobile terminal comprising:
  a receiver configured to receive communication signals from a base station;
  a location engine configured to accept navigational information and to thereby determine location of the mobile terminal;
  a controller configured to estimate a nominal PN offset of the received communication signals based on a distance between the mobile terminal and the base station based on the location of the mobile terminal, and to determine a search window to be used for processing received signals based on the estimate of the nominal PN offset; and
  a search engine configured to accept the search window and to perform a search of the received communication signal using the search window.

12. A base station comprising:
  a receiver configured to receive communication signals from a mobile terminal;
  a controller configured to estimate a nominal PN offset of the received communication signals based on a distance between the mobile terminal and the base station, and to determine a search window to be used for processing received signals based on the estimate of the nominal PN offset; and
  a search engine configured to accept the search window and to perform a search of the received communication signal using the search window.

13. A base station as defined in claim 12, wherein the nominal PN offset is transmitted from the base station to at least one mobile terminal.

14. A base station as defined in claim 12, wherein the search window is transmitted from the base station to at least one mobile terminal.

15. A base station comprising:
  a receiver configured to receive communication signals from a mobile terminal;
  a location engine configured to accept navigational information and thereby determine a location of the mobile terminal;
  a controller configured to estimate a nominal PN offset of the received communication signals based on a distance between the mobile terminal and the base station based on the location of the mobile terminal, and to determine a search window to be used for processing received signals based on the estimate of the nominal PN offset; and
  a search engine configured to accept the search window and to perform a search of the received communication signal using the search window.

16. A base station as defined in claim 15, wherein the nominal PN offset is transmitted from the base station to the mobile terminal.

17. A base station as defined in claim 15, wherein the search window is transmitted from the base station to the mobile terminal.

18. A communications system comprising:
  means for determining a distance between at least one mobile terminal and a base station based on their respective locations;
  means for estimating a nominal PN offset of signals transmitted between the base station and the at least one mobile terminal based on the distance between the at least one mobile terminal and the base station; and
  means for determining a search window used for processing received signals based on the estimate of the nominal PN offset.

19. A system as defined in claim 18, wherein the means for estimating the nominal PN offset and means for determining the search window are included in the base station.

* * * * *